US012542846B2

(12) United States Patent
Canberk et al.

(10) Patent No.: US 12,542,846 B2
(45) Date of Patent: Feb. 3, 2026

(54) PHONE CASE FOR TRACKING AND LOCALIZATION

(71) Applicant: Snap Inc., Santa Monica, CA (US)

(72) Inventors: Ilteris Kaan Canberk, Marina Del Rey, CA (US); Matthew Hallberg, Los Angeles, CA (US); Richard Zhuang, San Diego, CA (US)

(73) Assignee: Snap Inc., Santa Monica, CA (US)

( * ) Notice: Subject to any disclaimer, the term of this patent is extended or adjusted under 35 U.S.C. 154(b) by 506 days.

(21) Appl. No.: 17/970,274

(22) Filed: Oct. 20, 2022

(65) Prior Publication Data

US 2024/0137436 A1    Apr. 25, 2024
US 2024/0236225 A9    Jul. 11, 2024

(51) Int. Cl.
*H04M 1/72409*    (2021.01)
*H04B 1/3888*    (2015.01)
*H04M 1/72454*    (2021.01)

(52) U.S. Cl.
CPC .... *H04M 1/724092* (2022.02); *H04B 1/3888* (2013.01); *H04M 1/724097* (2022.02); *H04M 1/72454* (2021.01)

(58) Field of Classification Search
CPC ..... H04M 1/724092; H04M 1/724097; H04M 1/72454; H04B 1/3888; G02B 2027/014; G06F 3/0308; G06F 3/017
See application file for complete search history.

(56) References Cited

U.S. PATENT DOCUMENTS

| 10,084,501 | B1 | 9/2018 | Coverstone |
| 10,764,053 | B2 | 9/2020 | Brook et al. |
| 11,233,799 | B1 | 1/2022 | Whyte et al. |
| 2017/0192495 | A1 | 7/2017 | Drinkwater et al. |
| 2017/0308258 | A1 | 10/2017 | Xu et al. |
| 2019/0339922 | A1 | 11/2019 | Kawasaki et al. |

(Continued)

FOREIGN PATENT DOCUMENTS

| CN | 107423392 | 12/2017 |
| CN | 111782064 | 10/2020 |

(Continued)

OTHER PUBLICATIONS

"International Application Serial No. PCT/US2023/077192, International Search Report mailed Feb. 13, 2024", 3 pgs.

(Continued)

*Primary Examiner* — Marcos L Torres
(74) *Attorney, Agent, or Firm* — Schwegman Lundberg & Woessner, P.A.

(57) ABSTRACT

A case for a portable device like a smartphone includes light sources such as LEDs, which, when illuminated, can be detected and tracked by a head-worn augmented or virtual reality device. The light sources may be located at the corners of the case and may emit infrared light. A relative pose between the smartphone and the head-worn device can be determined based on computer vision techniques performed on images captured by the head-worn device that includes light from the light sources. Relative movement between the smartphone and the head-worn device can be used to provide user input to the head-worn device, as can touch input on the portable device. In some instances, the case is powered inductively from the portable device.

20 Claims, 10 Drawing Sheets

(56) References Cited

U.S. PATENT DOCUMENTS

| | | |
|---|---|---|
| 2020/0284587 A1 | 9/2020 | Hare |
| 2021/0356743 A1* | 11/2021 | Muldoon .............. G06F 3/0304 |
| 2021/0409954 A1 | 12/2021 | Frisk et al. |
| 2022/0101000 A1 | 3/2022 | Tham et al. |

FOREIGN PATENT DOCUMENTS

| | | | |
|---|---|---|---|
| KR | 101322205 B1 * | 10/2013 | ............. A45C 11/00 |
| WO | 2024086645 | 4/2024 | |

OTHER PUBLICATIONS

"International Application Serial No. PCT/US2023/077192, Written Opinion mailed Feb. 13, 2024", 4 pgs.

\* cited by examiner

PHONE CASE FOR TRACKING AND LOCALIZATION

TECHNICAL FIELD

The present disclosure relates generally to interactions between mobile devices, and more particularly to using a portable device as a controller for an augmented or virtual reality device.

BACKGROUND

One of the disadvantages of a head-worn augmented or virtual reality device is that there is relatively little space on the device for providing controls, and the use of these controls can interfere with the potential for freedom of movement inherent in such head worn devices. In some instances, dedicated handheld controls are provided, but this adds expense and inconvenience, since such devices need to be carried with the head-worn device, charged, and so forth.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
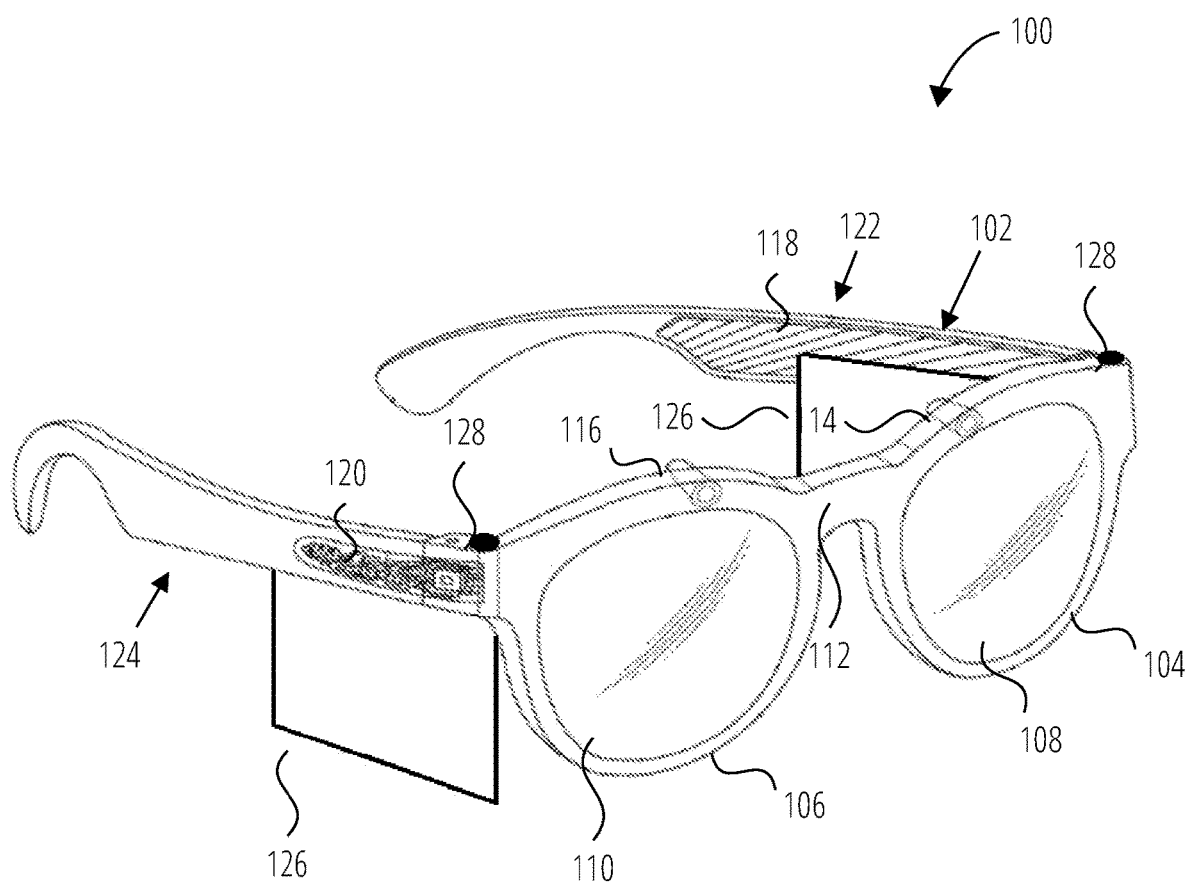
FIG. 1 is a perspective view of a head-worn device, in accordance with some examples.

Typical smart glasses platforms allow users to interact with various types of virtual content. Such platforms are configured to display the virtual content in the lenses of the smart glasses over a real-world environment seen through the lenses of the smart glasses. To interact with the virtual content, the smart glasses typically include an embedded sensor. The smart glasses can detect touch or swipe inputs based on the information detected by the embedded sensor and can then update a display of the virtual content. The interaction with the embedded sensor to perform various modifications of the virtual content is not very intuitive and has a very steep learning curve. As a result, users are unable to accurately perform various desired interactions with the virtual content which takes away from the overall experience of the user. Also, because of the steep learning curve, users typically have to re-perform certain actions multiple times until they learn how to use the sensors, which wastes resources of the smart glasses.

Certain smart glasses platforms use hand or gesture recognition to allow users to interact with the virtual content. Specifically, the smart glasses can detect hand gestures in images captured by the smart glasses and can perform corresponding modifications to the virtual content. Learning how to properly make such gestures also involves a steep learning curve and can also be non-intuitive. Also, performing image processing to detect hand gestures involves multiple machine learning models, which consumes a great deal of hardware resources of the smart glasses, which can be wasteful and drain the battery of the smart glasses. This can also lead to non-use of the smart glasses and takes away from the overall enjoyment of using the smart glasses.

The disclosed examples improve the efficiency of using the electronic device by providing an AR device that determines relative movement between the smartphone and the head-worn device to provide user input to the head-worn device. This improves the overall efficiency of operating the device and provides a more intuitive system for a user to use.

In some examples, a case for a portable device like a smartphone includes light sources such as LEDs, which, when illuminated, can be detected and tracked by a head-worn augmented or virtual reality device. The light sources may be located at the corners of the case, and may emit infrared light. A relative pose between the smartphone and the head-worn device can be determined by computer vision techniques performed on images captured by the head-worn device that include light from the light sources. The smartphone and head-worn device are performing visual-inertial odometry (VIO) to track their poses independently. Relative movement between the smartphone and the head-worn device, and movement of the smartphone, can be used to provide user input to the head-worn device, as can touch input on the smartphone. In some instances, the case is powered inductively from the portable device.

In some examples, provided is a computer-implemented method for providing gesture user input to a user interface displayed by a head-worn device using a portable device in a device case. The method may include illuminating light sources located on the device case, capturing, by the head-worn device, an image including representations of the light sources located in the device case, determining an initial relative pose between the head-worn device and the portable device based on the image, determining a change in the initial relative pose due to relative movement of the head-worn device and the portable device, and based on the change in the initial relative pose, updating a user interface.

Determining the change in the initial relative pose may include capturing a further image including representations of the light sources located in the device case, and determining an updated relative pose between the head-worn device and the portable device based on the further image.

Determining the change in the initial relative pose may include obtaining first VIO-based pose information for the head-worn device, obtaining second VIO-based pose information for the portable device, and determining a change in the initial relative pose between the head-worn device and the portable device based on the first VIO-based pose information and the second VIO-based pose information.

The light sources in the device case may be powered inductively from the portable device, and may be located at corners of the device case.

The computer-implemented method may also include further includes determining a change in an absolute pose of the portable device, and based on the change in the absolute pose of the portable device, updating a user interface.

In some examples, after a specified interval, a further image including representations of the light sources located in the device case is captured, and an updated relative pose between the head-worn device and the portable device is determined based on the further image. The initial relative pose is then set to the updated relative pose.

In some examples, provided is a non-transitory computer-readable storage medium, the computer-readable storage medium including instructions that when executed by a processor, cause the processor to perform operations for providing gesture user input to a user interface displayed by a head-worn device using a portable device in a device case, according to any of the methods and limitations described above, the operations including but not limited to capturing, by the head-worn device, an image including representations of light sources located in the device case, determining an initial relative pose between the head-worn device and the portable device based on the image, determining a change in the initial relative pose due to relative movement of the head-worn device and the portable device, and based on the change in the initial relative pose, updating a user interface.

In some examples, provided is a computing system including a head-worn device, a processor, and a memory storing instructions, and a device case for holding a portable device, the device case including light sources located therein. The instructions stored by the memory, when executed by the processor, configure the system to perform operations for providing gesture user input to a user interface displayed by the head-worn device when the light sources on the device case are illuminated according to any of the methods and limitations described above, the operations including but not limited to capturing, by the head-worn device, an image including representations of the light sources located in the device case, determining an initial relative pose between the head-worn device and the portable device based on the image, determining a change in the initial relative pose due to relative movement of the head-worn device and the portable device, and based on the change in the initial relative pose, updating a user interface.

Other technical features may be readily apparent to one skilled in the art from the following figures, descriptions, and claims.

FIG. 1 is a perspective view of a head-worn AR device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 302 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real world scene.

The glasses 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
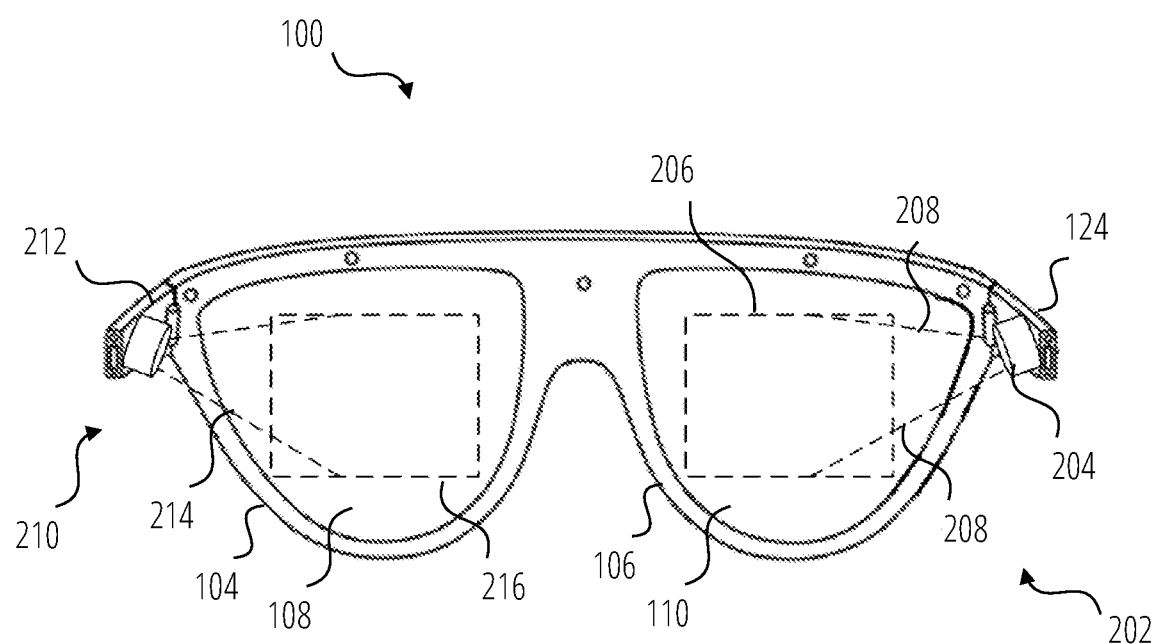
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real world seen by the user. Similarly, light 214 emitted by the projector 212 encounters the diffractive structures of the waveguide of the near eye display 216, which directs the light towards the left eye of a user to provide an image on or in the left optical element 108 that overlays the view of the real world seen by the user. The combination of a GPU, the forward optical assembly 202, the left optical element 108, and the right optical element 110 provide an optical engine of the glasses 100. The glasses 100 use the optical engine to generate an overlay of the real world view of the user including display of a 3D user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various 3D user interfaces on the near eye displays. As described in more detail herein, the user can then interact with the glasses 100 using a touchpad 126 and/or the buttons 128, voice inputs or touch inputs on an associated device (e.g., portable device 328 illustrated in FIG. 3), and/or hand movements, locations, and positions detected by the glasses 100.

Figure 3:
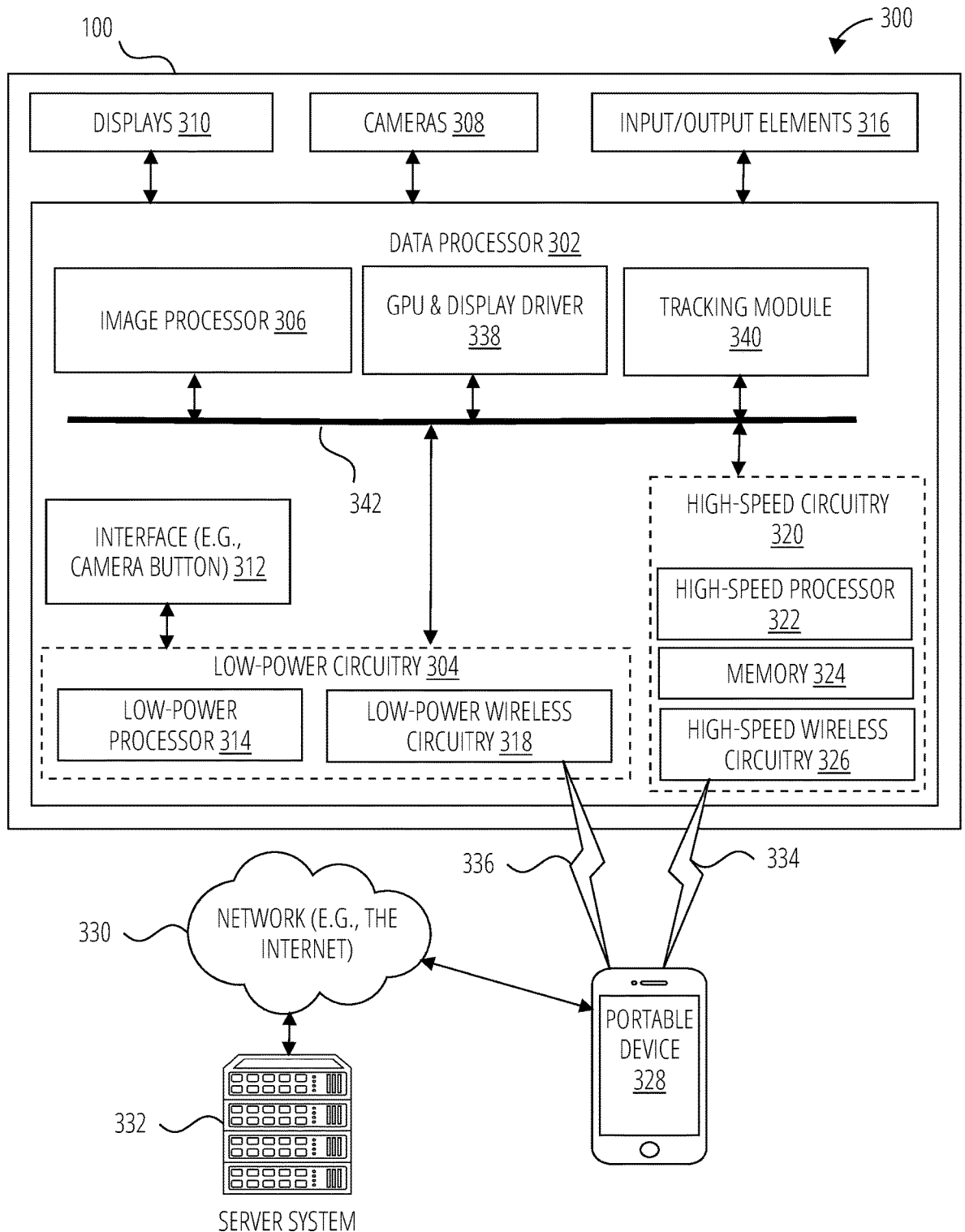
FIG. 3 is a block diagram illustrating a networked system including details of the head-worn device of FIG. 1, in accordance with some examples.

FIG. 3 is a block diagram illustrating a networked system 300 including details of the glasses 100, in accordance with some examples. The networked system 300 includes the glasses 100, a portable device 328, and a server system 332. The portable device 328 may be a smartphone, tablet, phablet, laptop computer, access point, or any other such device capable of connecting with the glasses 100 using a low-power wireless connection 336 and/or a high-speed wireless connection 334. The portable device 328 is connected to the server system 332 via the network 330. The network 330 may include any combination of wired and wireless connections. The server system 332 may be one or more computing devices as part of a service or network computing system. The portable device 328 and any elements of the server system 332 and network 330 may be implemented using details of the software architecture 804 or the machine 900 described in FIG. 8 and FIG. 9 respectively.

The glasses 100 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 8 and FIG. 9. For example, the input/output elements 316 may include any of I/O components 906 including output components 928, an inertial measurement unit 936, and so forth. Examples of the displays 310 are discussed in FIG. 2. In the particular examples described herein, the displays 310 include a display for the user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the cameras 308. In other examples, the interface 312 may have a software component, or may be associated with a command received wirelessly from another source, such as from the portable device 328.

The image processor 306 includes circuitry to receive signals from the cameras 308 and process those signals from the cameras 308 into a format suitable for storage in the memory 324 or for transmission to the portable device 328. In one or more examples, the image processor 306 (e.g., video processor) comprises a microprocessor integrated circuit (IC) customized for processing sensor data from the cameras 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 100. As described above, for example, the low-power processor 314 may accept user input signals from the interface 312. The low-power processor 314 may also be configured to receive input signals or instruction communications from the portable device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system used for the data processor 302. The high-speed processor 322 includes processing resources used for managing high-speed data transfers on the high-speed wireless connection 334 using the high-speed wireless circuitry 326. In some examples, the high-speed processor 322 executes an operating system such as a LINUX operating system or other such operating system such as the operating system 812 of FIG. 8. In addition to any other responsibilities, the high-speed processor 322 executing a software architecture for the data processor 302 is used to manage data transfers with the high-speed wireless circuitry 326. In some examples, the high-speed wireless circuitry 326 is configured to implement Institute of Electrical and Electronic Engineers (IEEE) 802.11 communication standards, also referred to herein as Wi-Fi. In other examples, other high-speed communications standards may be implemented by the high-speed wireless circuitry 326.

The memory 324 includes any storage device capable of storing camera data generated by the cameras 308 and the image processor 306. While the memory 324 is shown as integrated with the high-speed circuitry 320, in other examples, the memory 324 may be an independent stand-alone element of the data processor 302. In some such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is desired.

The tracking module 340 estimates the position and orientation (the "pose") of the glasses 100. For example, the tracking module 340 uses image data and corresponding inertial data from the cameras 308 and the position components 940, as well as GPS data, to track a location and determine a pose of the glasses 100 relative to a frame of reference (e.g., real-world environment). The tracking module 340 continually gathers and uses updated sensor data describing movements of the glasses 100 to determine updated three-dimensional poses of the glasses 100 that indicate changes in the relative position and orientation relative to physical objects in the real-world environment. The tracking module 340 permits visual placement of virtual objects relative to physical objects by the glasses 100 within the field of view of the user via the displays 310.

The GPU & display driver 338 may use the pose of the glasses 100 to generate frames of virtual content or other content to be presented on the displays 310 when the glasses 100 are functioning in a traditional augmented reality mode. In this mode, the GPU & display driver 338 generates updated frames of virtual content based on updated three-dimensional poses of the glasses 100, which reflect changes in the position and orientation of the user in relation to physical objects in the user's real-world environment.

One or more functions or operations described herein may also be performed in an application resident on the glasses 100 or on the portable device 328, or on a remote server. For example, one or more functions or operations described herein may be performed by one of the applications 806 such as messaging application 846.

Figure 4B:
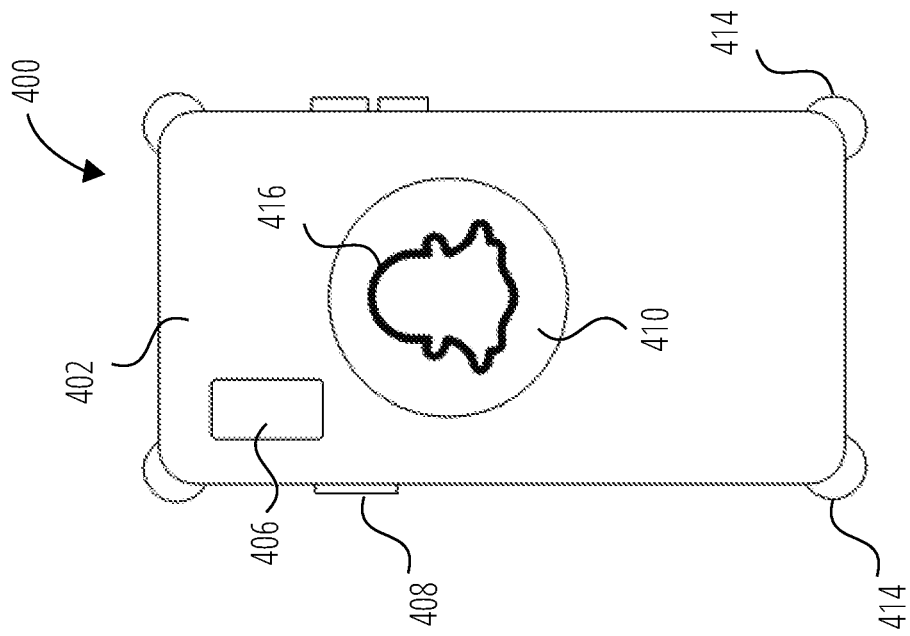
FIG. 4A and FIG. 4B respectively show the front and rear of a smartphone case 400, according to some examples.
Figure 4A:
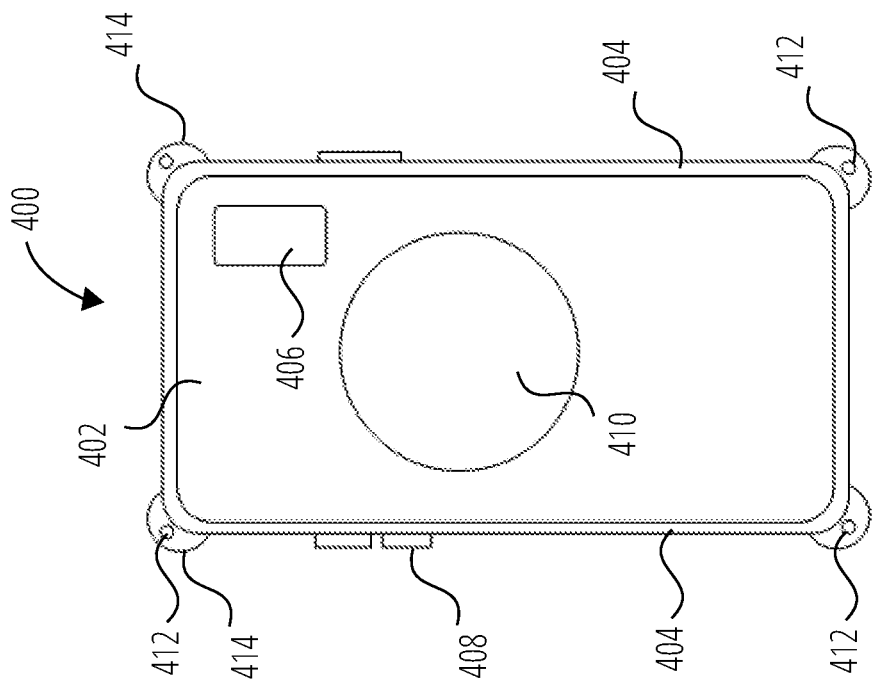

FIG. 4A and FIG. 4B respectively show the front and rear of a smartphone case 400, according to some examples. The case 400 includes a body 402 with sidewalls 404 that define a recess in the front side into which a smartphone is received. The case 400 includes a camera aperture 406 through which one or more cameras on the smartphone can capture images and video. The case 400 also includes buttons 408 that have positions that correspond to buttons on the smartphone.

The case 400 also has an inductive pad and control electronics 410, which may bulge from the rear of the case 400 in some examples. The inductive pad and control electronics 410 receive power from a corresponding inductive pad in the smartphone, which can either power the control electronics directly or charge a battery in the case 400.

The case 400 also includes four LEDs 412 located in protrusions 414 at the four corners of the case. The LEDs 412, which in some examples emit infrared light, provide an optical output that is fixed relative to the smartphone, and which can be used by the glasses 100 to determine a relative pose between the smartphone and the glasses. The LEDs 412 may be provided in different shapes, but in some examples provide dots or points of light, the locations or centroids of which are easier to determine than other LED shapes. There may also be different numbers of LEDs 412 in different locations that may not be symmetrical, but a symmetrical arrangement of an even number of LEDs 412 is likely to be more visually pleasing to a user of the case.

The LEDs 412 are illuminated by the inductive pad and control electronics 410 based on user input, or a signal from an application running on the portable device 328 or the glasses 100. In some examples, the LEDs 412 are illuminated based on direct user input (such as pressing an "on" button on the case 400 or in an application user interface), or may be indirect (such as by selecting a function within an application that would benefit from the use thereof).

Instructions to switch the LEDs on or off and other data can be passed from the portable device 328 to the case 400 by NFC or other short-range communication protocol. If the case 400 is powered inductively, the inductive coil in the portable device 328 will be activated in advance of any instructions transmitted from the portable device 328 to the case 400. In some examples, the LEDs will be turned on and off simply by activation and deactivation of the inductive coil in the portable device 328. In further examples, activation of the inductive coil in the portable device 328 can occur automatically based on detection of the case 400 being put on the portable device, for example as a result of detecting an appropriate change in capacitance or resonance of the transmitting inductive coil in the portable device 328. In such a case, all a user needs to do is put the case 400 on the portable device 328 and the LEDs 412 will be illuminated and can be tracked by the glasses 100.

Since the LEDs 412 in some examples emit infrared light, a user of the case 400 may not be aware when they are or are not illuminated. To provide visual feedback, the rear of the case 400 may be provided with a logo 416 that is backlit by an LED that emits visible light. Such an LED is connected to the inductive pad and control electronics 410 and will illuminate the logo 416 when the LEDs 412 are illuminated.

Figure 5A:
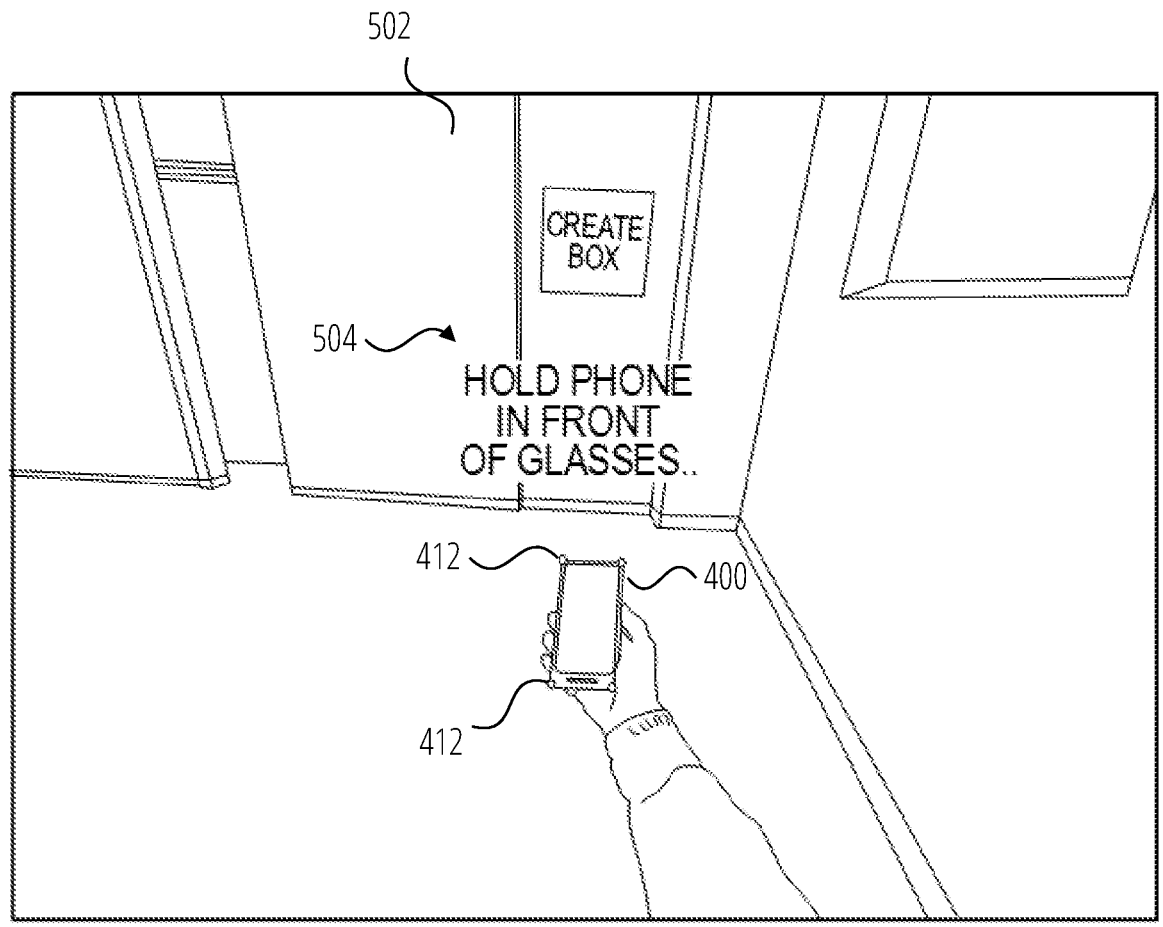
FIG. 5A is view of an environment 502 through a user's glasses, in which the portable device and a case are visible, according to some examples.

FIG. 5A is view of an environment 502 through a user's glasses 100, in which the portable device 328 and the case 400 are visible, according to some examples. In this case, the LEDs 412 are illuminated to permit relative pose determination as described below. Also shown in FIG. 5A is a text prompt 504, displayed by the glasses 100 to the user, instructing them to hold the phone in front of the glasses 100 so that the relative pose can be determined. In most instances it will not be necessary to prompt the user to hold the portable device 328 in front of them, since its use as a gesture input device should naturally involve it being held in front of the user. Once the LEDs 412 are illuminated, the tracking of the portable device 328 by the glasses 100 can proceed without instructing the user to do anything, as long as the portable device 328 is in the field of view of the glasses 100. Appropriates message(s) can however be provided if the portable device 328 is not within the field of view of the glasses 100, or when providing a tutorial on gesture input.

Both the portable device 328 and the glasses 100 are performing visual-inertial odometry (VIO), to determine and keep track of their respective positions and orientations ("poses") within the environment 502. A relative pose between the glasses 100 and the portable device 328 can be determined by having the glasses 100 extract the locations of the LEDs 412 in an image captured by one or more of the cameras 308 in the glasses 100. Since the relative positions on the case 400 of the LEDs 412 is known, the glasses 100 can determine a pose transformation between the case 400 (and thus the portable device 328) and the glasses 100. Subsequent images captured by one of the glasses 100 can similarly be used to update any change in the relative pose between the portable device 328 and the glasses 100, or to provide a periodic recalibration of the relative pose as determined by VIO running on the two devices as will be described in more detail below.

In some cases, the coordinate systems of the body 402/portable device 328 and the glasses 100 are adjusted or aligned so that the poses of both devices are represented in the same coordinate system, for example a "World" coordinate system tied to the local physical environment.

The glasses 100 may have less processing power and battery capacity than the portable device 328. To avoid the glasses 100 having constantly to determine the relative pose of the glasses 100 and the portable device 328 by extracting the locations of the LEDs 412 in images captured by the glasses 100, changes to the relative pose can be determined from changes to the individual poses of the glasses 100 and the portable device 328 as determined by VIO. To preempt drift that may occur from such inertial tracking, an optical determination of the relative poses using the locations of the LEDs 412 in an image captured by the glasses 100 can be performed periodically to recalibrate the relative pose between the glasses 100 and the portable device 328. The periodic recalibration occurs at a frequency that is a balance between ensuring sufficient accuracy between the relative poses and power savings for the glasses 100. In some examples, the relative pose is recalibrated once a second.

In some examples, the determination of VIO-based relative-pose updates is performed by the portable device 328. The VIO-based pose of the glasses 100 is transmitted to the portable device 328 by a short-range transmission method such as Bluetooth, over a link between the two that has been previously established. The relative pose between the two devices is then determined by the portable device 328 and is transmitted back to the glasses 100.

Also transmitted from the portable device 328 to the glasses 100 is the actual pose (or a pose update) for the portable device 328 itself, as well as any button or touch-screen inputs received at the portable device 328. As will be discussed in more detail below, the relative pose between the glasses 100 and the portable device 328, as well as the pose of the portable device 328 itself are used as an input to the user interface of the glasses 100.

Figure 5B:
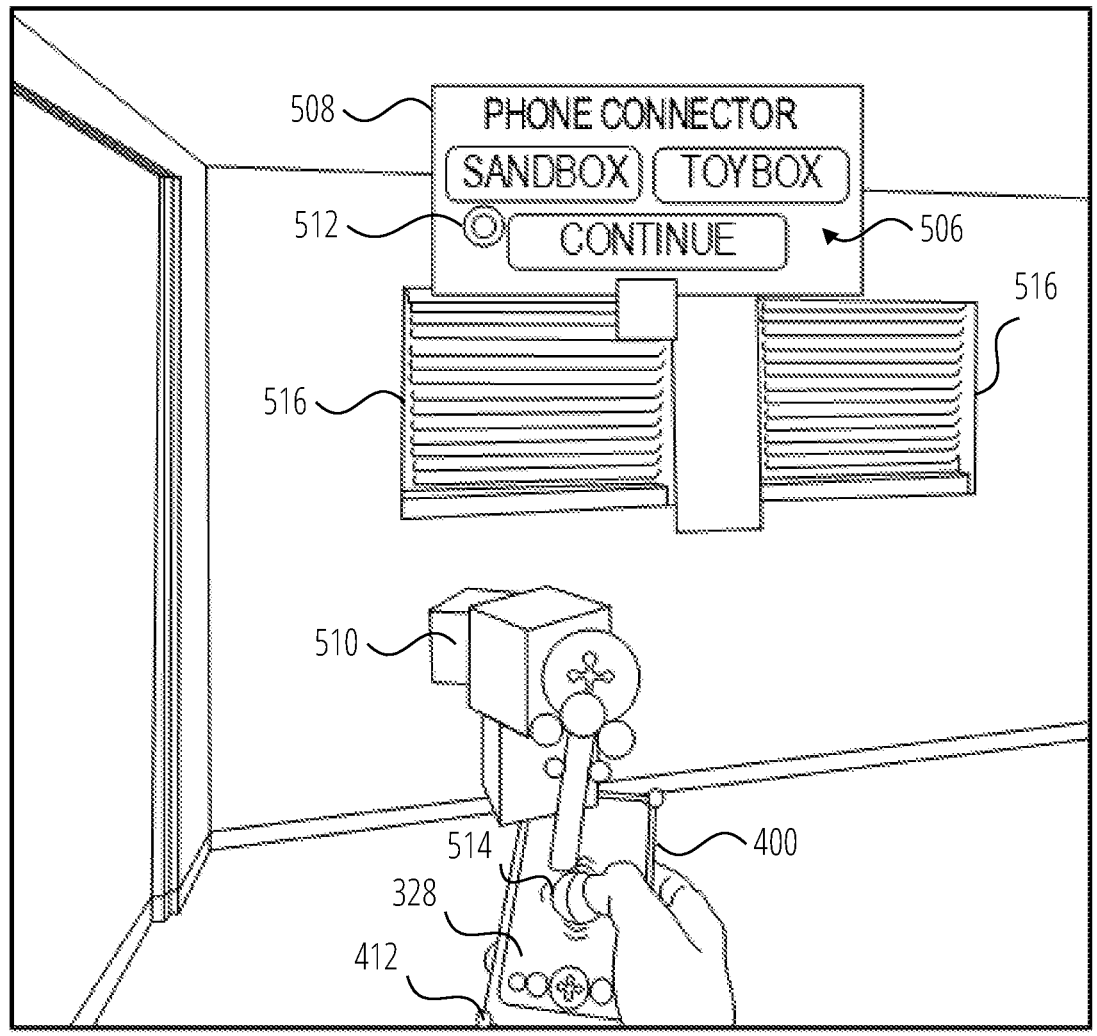
FIG. 5B is view of an environment through a user's glasses, in which the case is functioning as an input device for the glasses, according to some examples.

FIG. 5B is view of an environment 502 through a user's glasses 100, in which movement of the case 400 is functioning as an input device for the glasses 100, according to some examples. In FIG. 5B, a Bluetooth communications link has been established between the portable device 328 and the glasses 100, and the coordinate systems of the two devices aligned as described above. The portable device 328 is reporting its pose and any user touch inputs received, to the glasses 100 via a short-range data transmission link. In some examples, the portable device 328 is also determining and reporting updates to the relative pose between the portable device 328 and the glasses 100 based on VIO-based pose updates received from the glasses 100.

Periodically, the glasses 100 capture an image including the LEDs 412 located in the case 400, and determine a relative pose between the glasses 100 and the portable device 328 based on the position in the image of the LEDs 412.

As shown, the portable device 328 is displaying a user interface element such as a directional touchpad 514 that for example can be used to receive touch input that will move a cursor 512 displayed by the glasses 100. The movement of the cursor 512 may also be controlled by movement of the portable device 328. Also shown are various AR elements 510, displayed by the glasses 100, that are anchored to the portable device 328. The AR elements 510 may for example include a virtual reality pointer or beam that can provide a visual indication of where the portable device 328 is being pointed. Also shown is a user interface window 508 that is being displayed by the glasses 100. Included in the window 508 are user interface elements 506 such as buttons or other UI elements that can be selected to perform various functions.

Using a combination of touch inputs and gestures using the portable device 328, a user can interact with augmented reality elements displayed by the glasses, such as AR elements 510 and the window 508. For example, by pointing the portable device 328 (and thus the case 400) in different directions, a user can move the cursor 512 within the field of view of the displays 310, for example to place it over one of the user interface elements 506, such as a button, in the window 508. The button can then be activated with a single touch on the touchscreen of the portable device 328. The window can also for example be moved within the field of view of the glasses 100 by moving the cursor over the window 508, pressing and holding on the touchscreen and then pointing the portable device 328 to drag the window towards an intended location of the window 508 in the environment or in the displays 310 of the glasses 100.

The portable device 328 thus functions as a six degree of freedom controller, with touch input, for the glasses 100. This alleviates some of the challenges of providing a user interface on the glasses 100.

Which pose or poses are used to affect the UI elements will vary. The positioning of the AR elements 510, fixed to the portable device 328, is dependent on the relative poses of the portable device 328 and the glasses 100, since, as the two devices move relative to one another, it will be necessary to update the perceived position of the AR elements 510 as displayed by the glasses 100. In the situation where movement of the cursor 512 is effected by movement of the portable device 328, the position of the cursor in the field of view of the glasses may depend only on the pose of the portable device 328, to permit a user to turn their head without the cursor 512 moving out of the field of view of the glasses 100.

Finally, if the position of the window 508 is fixed relative to the glasses 100, neither a change in the pose of the glasses 100 nor a change in the pose of the portable device 328 will affect the position of the window 508 in the field of view of the glasses 100. On the other hand, if the position of the window 508 is fixed relative to items in the surrounding environment (e.g., above the windows 516) then the position of the window 508 in the field of view of the glasses 100 will vary with the pose of the glasses 100 but not the portable device 328.

User interface elements will, in some examples, have associated parameters specifying in which coordinate system (that of the glasses 100, the portable device 328 or the environment) the particular user interface element is located, thus specifying which device movement will (or will not) affect movement of the corresponding user interface element. Additional user inputs may also be included or available, such as voice commands.

Figure 6:
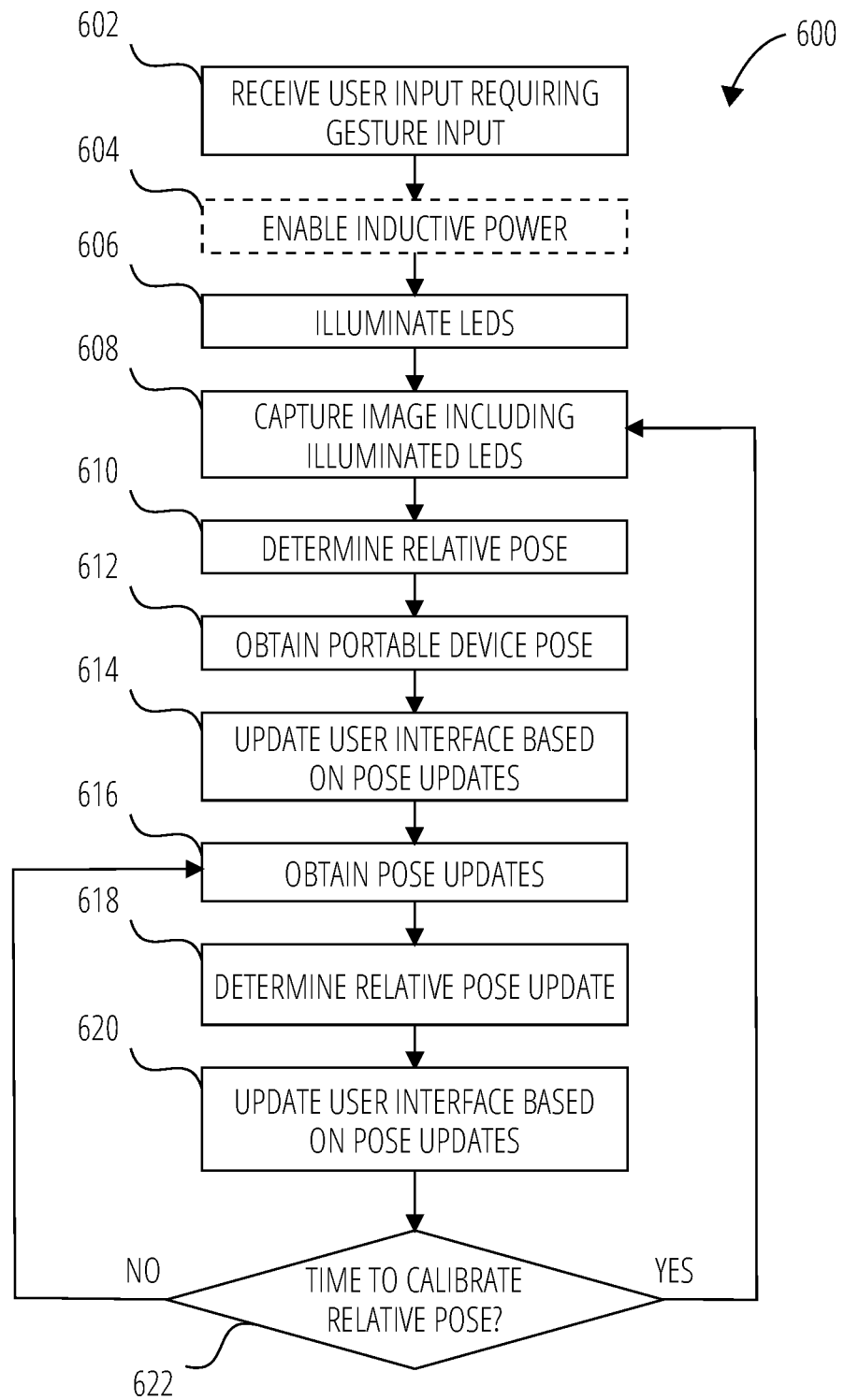
FIG. 6 is a flowchart 600 illustrating a method of providing input to a user interface on a head-worn device according to some examples.

FIG. 6 is a flowchart 600 illustrating a method of providing input to a user interface on a head-worn device according to some examples. For explanatory purposes, the operations of the flowchart 600 are described herein as occurring in serial, or linearly. However, multiple operations of the flowchart 600 may occur in parallel. In addition, the operations of the flowchart 600 need not be performed in the order shown and/or one or more blocks of the flowchart 600 need not be performed and/or can be replaced by other operations. The operations of the flowchart 600 may be performed by the glasses 100, the portable device 328, or some combination thereof.

The method commences at operation 602, with the portable device 328 or the glasses 100 receiving user input that initiates, specifies or requires use of the portable device 328 or case 400 to provide gesture user input. Such user input may for example be selecting functionality within an application running on the glasses 100 or portable device 328 that uses gesture input, or by user selection of an application, such as a game, that uses gesture input.

In operation 604, the portable device 328 enables its inductive coil, thereby to provide power to the case 400, if required. In operation 606, the LEDS 412 are illuminated by the inductive pad and control electronics 410, in response to an instruction received from the portable device 328 or the glasses 100 or the activation of an on/off button on the case 400. An instruction may then be provided by the glasses 100 or the portable device 328 to hold the phone in front of the wearer of the glasses 100 as shown in FIG. 5A An image of the case with the illuminated LEDs is then captured by the glasses 100 in operation 608. The relative pose between the glasses 100 and the portable device 328 is determined in operation 610, and the pose of the portable device 328 is received by the glasses 100 from the portable device 328 by short range data transmission in operation 612.

The user interface displayed by the glasses 100 is updated by the glasses 100 based on the updated relative pose and the pose updates in operation 614, for example as discussed above with reference to FIG. 6. In some examples, the updating in operation 614 is the setting of initial values for the user interface, on the assumption that the current poses of the two devices represent an initial or neutral pose for the user of the portable device 328, for example to locate the cursor 512 in the center of the field of view of the glasses 100.

In operation 616, VIO-based pose updates are obtained from/determined by the portable device 328 and the glasses 100. A relative pose update between the portable device 328 and the glasses 100 is then determined in operation 618. In some examples, the VIO-based pose update for the glasses 100 is transmitted to the portable device 328, which determines the relative pose update and transmits it back to the glasses 100. In other examples, the VIO-based pose update for the portable device 328 is transmitted to the glasses 100, which determines the relative pose update.

In operation 620, the user interface displayed by the glasses 100 is updated by the glasses 100 based on the updated relative pose and the pose updates, for example as discussed above with reference to FIG. 6.

In operation 622, the glasses 100 determine whether it is time to recalibrate the relative pose between the glasses 100 and the portable device 328, to address any potential drift in the relative pose as determined by VIO running on the two devices. If it is not yet time, the method returns to operation 616 where VIO pose updates are obtained, and the method continues from there. If it is time, the method returns to operation 608 where a further image including the LEDs 412 is captured by the glasses 100, and the method continues from there.

The method in the flowchart 600 continues until user input is received terminating use of the portable device 328 as a gesture input device. This could for example be exiting the relevant functionality within an application, or exiting the application.

Figure 7:
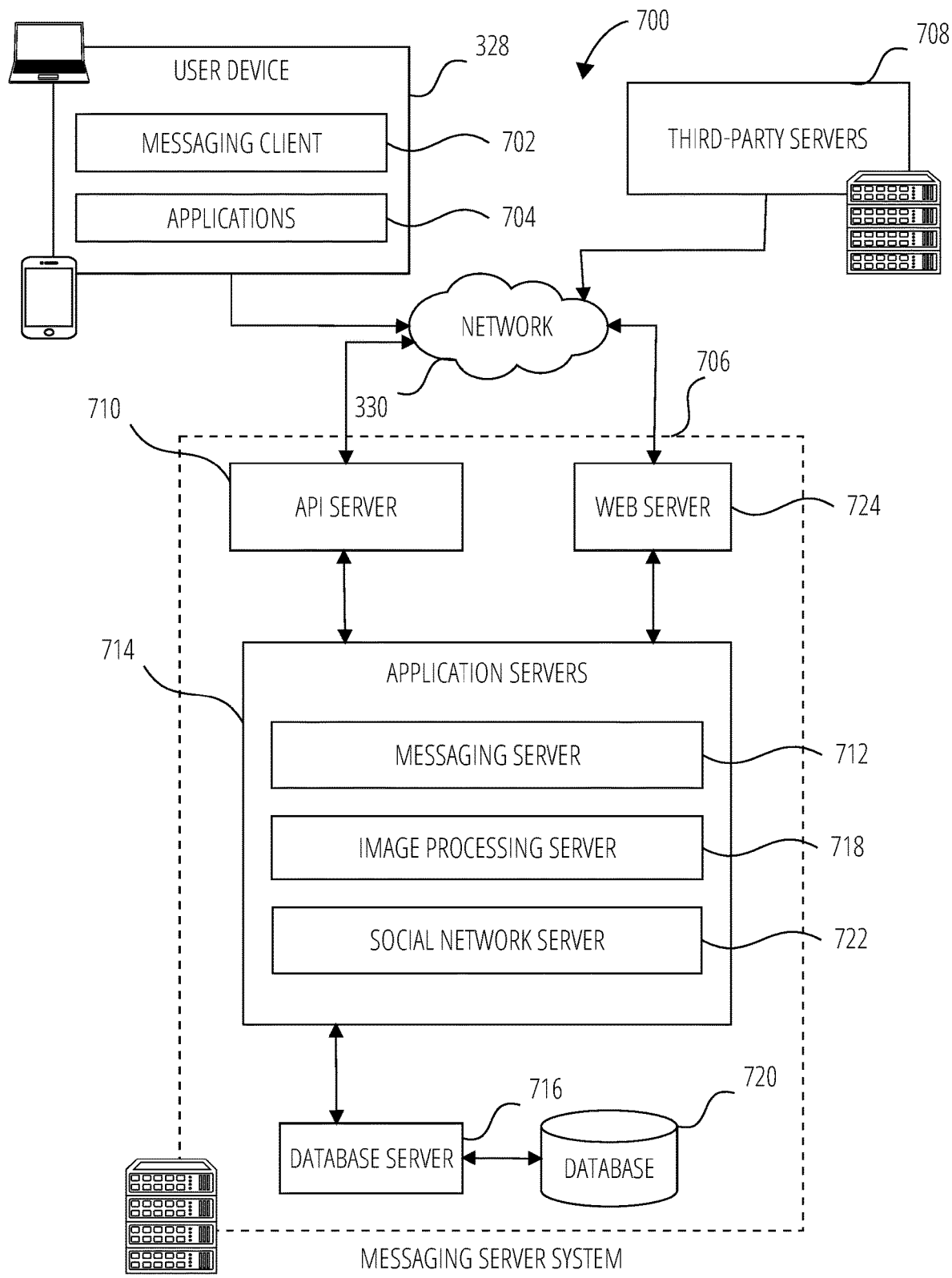
FIG. 7 is a diagrammatic representation of a networked environment in which the present disclosure may be deployed, in accordance with some examples.

FIG. 7 is a block diagram showing an example messaging system 700 for exchanging data (e.g., messages and associated content) over a network. The messaging system 700 includes multiple instances of a portable device 328 which host a number of applications, including a messaging client 702 and other applications 704. A messaging client 702 is communicatively coupled to other instances of the messaging client 702 (e.g., hosted on respective other portable devices 328), a messaging server system 706 and third-party servers 708 via a network 330 (e.g., the Internet). A messaging client 702 can also communicate with locally-hosted applications 704 using Application Program Interfaces (APIs).

A messaging client 702 is able to communicate and exchange data with other messaging clients 702 and with the messaging server system 706 via the network 330. The data exchanged between messaging clients 702, and between a messaging client 702 and the messaging server system 706, includes functions (e.g., commands to invoke functions) as well as payload data (e.g., text, audio, video or other multimedia data).

The messaging server system 706 provides server-side functionality via the network 330 to a particular messaging client 702. While some functions of the messaging system 700 are described herein as being performed by either a messaging client 702 or by the messaging server system 706, the location of some functionality either within the messaging client 702 or the messaging server system 706 may be a design choice. For example, it may be technically preferable to initially deploy some technology and functionality within the messaging server system 706 but to later migrate this technology and functionality to the messaging client 702 where a portable device 328 has sufficient processing capacity.

The messaging server system 706 supports various services and operations that are provided to the messaging client 702. Such operations include transmitting data to, receiving data from, and processing data generated by the messaging client 702. This data may include message content, user device information, geolocation information, media augmentation and overlays, message content persistence conditions, social network information, and live event information, as examples. Data exchanges within the messaging system 700 are invoked and controlled through functions available via user interfaces (UIs) of the messaging client 702.

Turning now specifically to the messaging server system 706, an Application Program Interface (API) server 710 is coupled to, and provides a programmatic interface to, application servers 714. The application servers 714 are communicatively coupled to a database server 716, which facilitates access to a database 720 that stores data associated with messages processed by the application servers 714. Similarly, a web server 724 is coupled to the application servers 714, and provides web-based interfaces to the application servers 714. To this end, the web server 724 processes incoming network requests over the Hypertext Transfer Protocol (HTTP) and several other related protocols.

The Application Program Interface (API) server 710 receives and transmits message data (e.g., commands and message payloads) between the portable device 328 and the application servers 714. Specifically, the Application Program Interface (API) server 710 provides a set of interfaces (e.g., routines and protocols) that can be called or queried by the messaging client 702 in order to invoke functionality of the application servers 714. The Application Program Interface (API) server 710 exposes various functions supported by the application servers 714, including account registration, login functionality, the sending of messages, via the application servers 714, from a particular messaging client 702 to another messaging client 702, the sending of media files (e.g., images or video) from a messaging client 702 to a messaging server 712, and for possible access by another messaging client 702, the settings of a collection of media data (e.g., story), the retrieval of a list of friends of a user of a portable device 328, the retrieval of such collections, the retrieval of messages and content, the addition and deletion of entities (e.g., friends) to an entity graph (e.g., a social graph), the location of friends within a social graph, and opening an application event (e.g., relating to the messaging client 702).

The application servers 714 host a number of server applications and subsystems, including for example a messaging server 712, an image processing server 718, and a social network server 722. The messaging server 712 implements a number of message processing technologies and functions, particularly related to the aggregation and other processing of content (e.g., textual and multimedia content) included in messages received from multiple instances of the messaging client 702. As will be described in further detail, the text and media content from multiple sources may be aggregated into collections of content (e.g., called stories or galleries). These collections are then made available to the messaging client 702. Other processor and memory intensive processing of data may also be performed server-side by the messaging server 712, in view of the hardware requirements for such processing.

The application servers 714 also include an image processing server 718 that is dedicated to performing various image processing operations, typically with respect to images or video within the payload of a message sent from or received at the messaging server 712.

The social network server 722 supports various social networking functions and services and makes these functions and services available to the messaging server 712. To this end, the social network server 722 maintains and accesses an entity graph within the database 720. Examples of functions and services supported by the social network server 722 include the identification of other users of the messaging system 700 with which a particular user has relationships or is "following," and also the identification of other entities and interests of a particular user.

The messaging client 702 can notify a user of the portable device 328, or other users related to such a user (e.g., "friends"), of activity taking place in shared or shareable sessions. For example, the messaging client 702 can provide participants in a conversation (e.g., a chat session) in the messaging client 702 with notifications relating to the current or recent use of a game by one or more members of a group of users. One or more users can be invited to join in an active session or to launch a new session. In some examples, shared sessions can provide a shared augmented reality experience in which multiple people can collaborate or participate.

Figure 8:
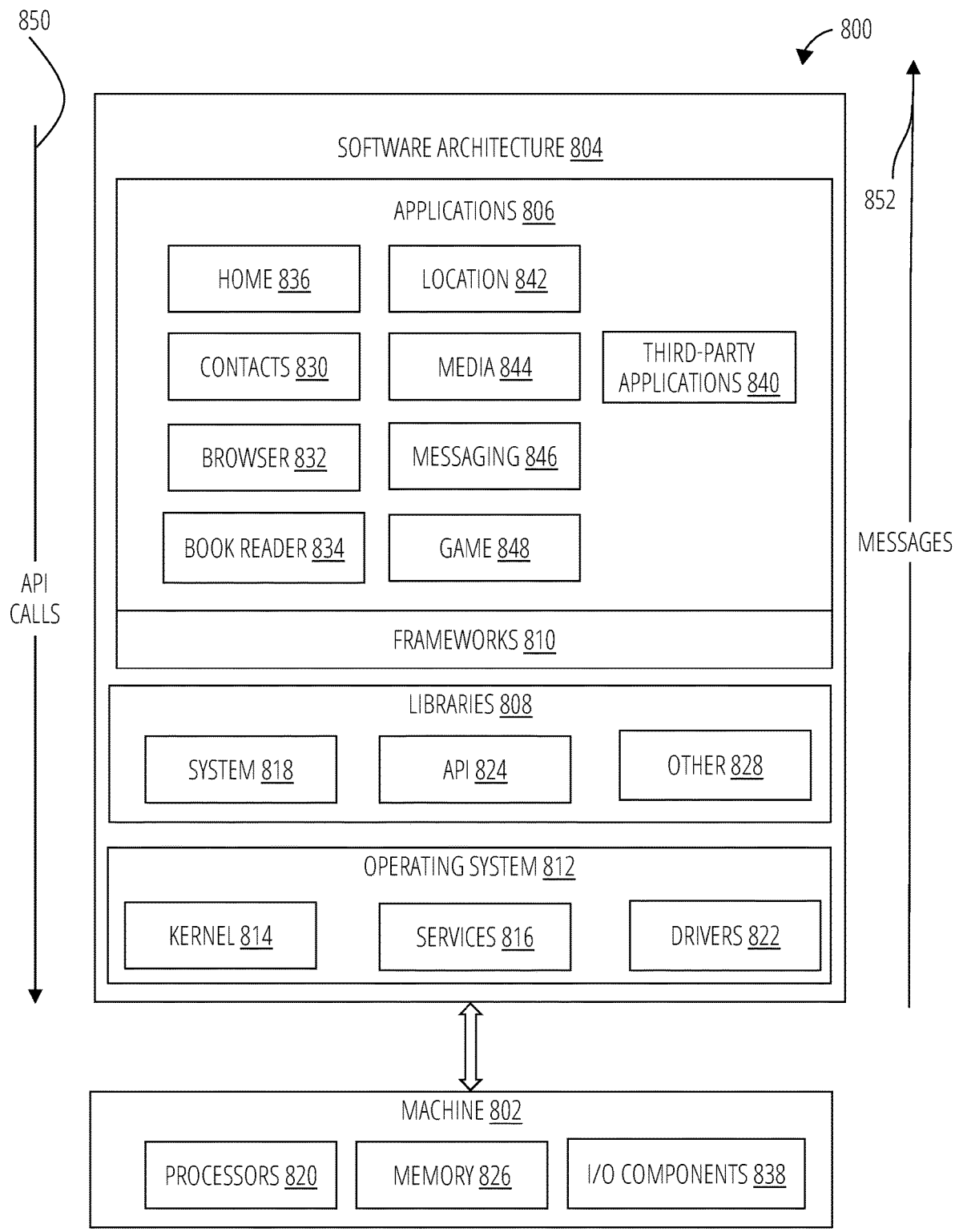
FIG. 8 is a block diagram showing a software architecture within which the present disclosure may be implemented, in accordance with some examples.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where individual layers provides a particular functionality. The software architecture 804 includes layers such as an operating system 812, libraries 808, frameworks 810, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionalities. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 808 provide a low-level common infrastructure used by the applications 806. The libraries 808 can include system libraries 818 (e.g., C standard library) that provide functions such as memory allocation functions, string manipulation functions, mathematic functions, and the like. In addition, the libraries 808 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement 3D user interfaces), image feature extraction libraries (e.g. OpenIMAJ), database libraries (e.g., SQLite to provide various relational database functions), web libraries (e.g., WebKit to provide web browsing functionality), and the like. The libraries 808 can also include a wide variety of other libraries 828 to provide many other APIs to the applications 806.

The frameworks 810 provide a high-level common infrastructure that is used by the applications 806. For example, the frameworks 810 provide various graphical user interface (GUI) functions, high-level resource management, and high-level location services. The frameworks 810 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as third-party applications 840.

The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party applications 840 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 840 can invoke the API calls 850 provided by the operating system 812 to facilitate functionality described herein.

Figure 9:
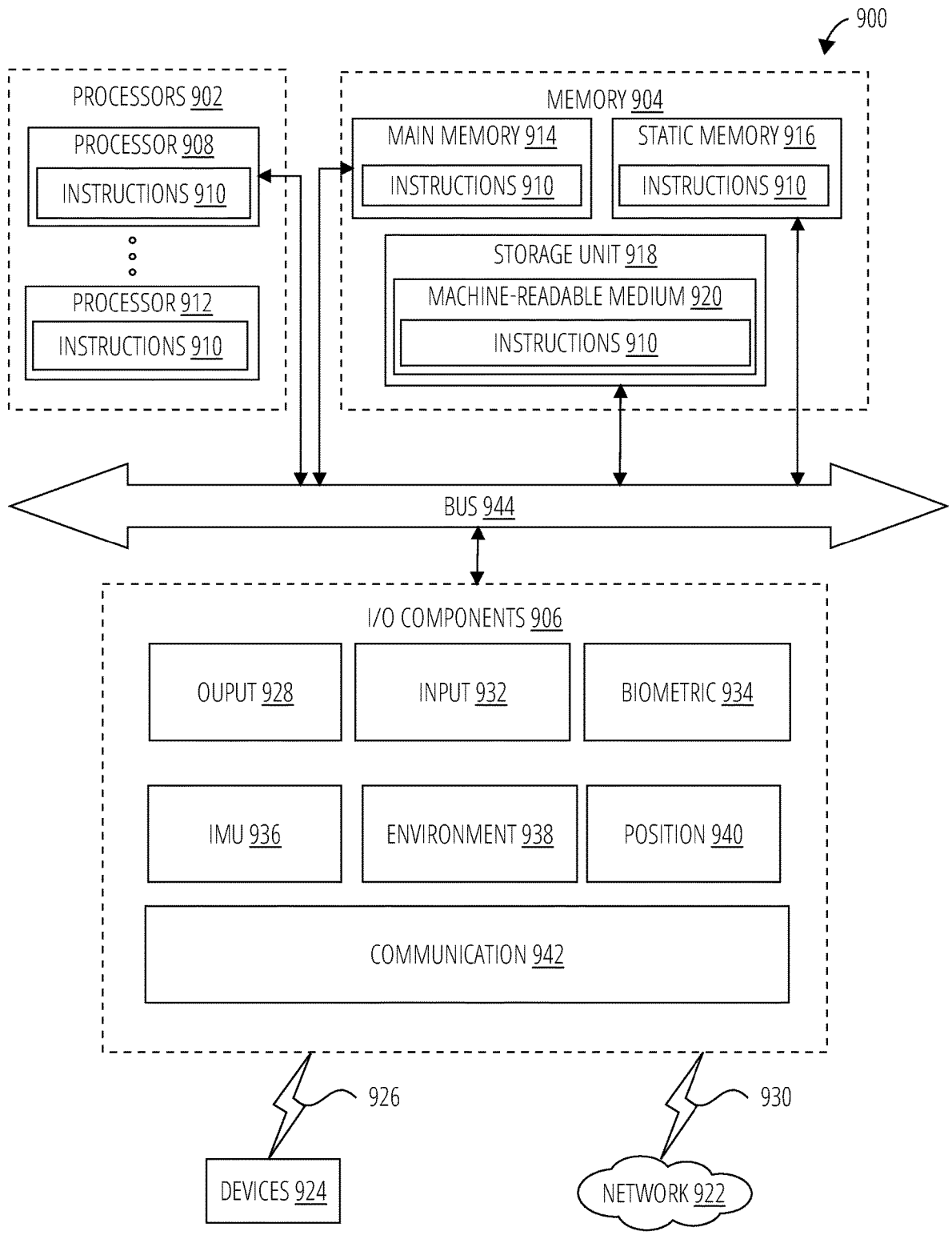
FIG. 9 is a diagrammatic representation of a machine, in the form of a computer system within which a set of instructions may be executed for causing the machine to perform any one or more of the methodologies discussed herein in accordance with some examples.

FIG. 9 is a diagrammatic representation of a machine 900 or computing apparatus within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while a single machine 900 is illustrated, the term "machine" may also be taken to include a collection of machines that individually or jointly execute the instructions 910 to perform any one or more of the methodologies discussed herein.

The machine 900 may include processors 902, memory 904, and I/O components 906, which may be configured to communicate with one another via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 914, a static memory 916, and a storage unit 918, both accessible to the processors 902 via the bus 944. The main memory 904, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within one or more of the processors 902 (e.g., within the processor's cache memory), or any suitable combination thereof, during execution thereof by the networked system 300.

The I/O components 906 may include a wide variety of components to receive input, provide output, produce output, transmit information, exchange information, capture measurements, and so on. The specific I/O components 906 that are included in a particular machine will depend on the type of machine. For example, portable machines such as mobile phones may include a touch input device or other such input mechanisms, while a headless server machine will likely not include such a touch input device. It will be appreciated that the I/O components 906 may include many other components that are not shown in FIG. 9. In various examples, the I/O components 906 may include output components 928 and input components 932. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 932 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 906 may include biometric components 934, inertial measurement unit 936, environmental components 938, or position components 940, among a wide array of other components. For example, the biometric components 934 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The inertial measurement unit 936 include acceleration sensor components (e.g., accelerometer), gravitation sensor components, rotation sensor components (e.g., gyroscope), and so forth. The environmental components 938 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 940 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 906 further include communication components 942 operable to couple the networked system 300 to a network 922 or devices 924 via a coupling 930 and a coupling 926, respectively. For example, the communication components 942 may include a network interface component or another suitable device to interface with the network 922. In further examples, the communication components 942 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 924 may be another machine or any of a wide variety of peripheral devices (e.g., a peripheral device coupled via a USB).

Moreover, the communication components 942 may detect identifiers or include components operable to detect identifiers. For example, the communication components 942 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 942, such as location via Internet Protocol (IP) geolocation, location via Wi-Fi® signal triangulation, location via detecting an NFC beacon signal that may indicate a particular location, and so forth.

The various memories (e.g., memory 904, main memory 914, static memory 916, and/or memory of the processors 902) and/or storage unit 918 may store one or more sets of instructions and data structures (e.g., software) embodying or used by any one or more of the methodologies or functions described herein. These instructions (e.g., the instructions 910), when executed by processors 902, cause various operations to implement the disclosed examples.

The instructions 910 may be transmitted or received over the network 922, using a transmission medium, via a network interface device (e.g., a network interface component included in the communication components 942) and using any one of a number of well-known transfer protocols (e.g., hypertext transfer protocol (HTTP)). Similarly, the instructions 910 may be transmitted or received using a transmission medium via the coupling 926 (e.g., a peer-to-peer coupling) to the devices 924.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "user device" or "client device" refers to any machine that interfaces to a communications network to obtain resources from one or more server systems or other user or client devices. A user or client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an Application Specific Integrated Circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" or "machine-storage medium" refers to a single or multiple non-transitory storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

The invention claimed is:

1. A computer-implemented method for providing gesture user input to a user interface displayed by a head-worn device, using movement of a portable device in a device case, the method comprising:
   capturing, by the head-worn device, an image of the device case;
   receiving, by the head-worn device from the portable device, a pose of the portable device, the pose of the portable device including a position of the portable device in an environment;
   determining, by the head-worn device, an initial relative pose between the head-worn device and the portable device based on the image and the pose of the portable device;
   determining, by the head-worn device, a visual-inertial odometry (VIO)-based pose of the head-worn device:
   transmitting, by the head-worn device to the portable device, the VIO-based pose of the head worn device;
   determining, by the portable device, a change in the initial relative pose due to relative movement of the head-worn device and the portable device using the VIO-based pose of the head worn device;
   transmitting, by the portable device to the head worn device, the change in the initial relative pose; and
   based on the change in the initial relative pose, updating a user interface.

2. The computer-implemented method of claim 1, wherein determining the change in the initial relative pose comprises:
   capturing a further image including representations of the light sources located in the device case; and
   determining an updated relative pose between the head-worn device and the portable device based on the further image.

3. The computer-implemented method of claim 1, wherein determining the change in the initial relative pose further comprises:
   obtaining first pose information for the head-worn device;
   obtaining second pose information for the portable device; and
   determining a change in the initial relative pose between the head-worn device and the portable device based on the first pose information and the second pose information.

4. The computer-implemented method of claim 3, further comprising:
   after a specified interval, capturing a further image including representations of the light sources located in the device case;
   determining an updated relative pose between the head-worn device and the portable device based on the further image; and
   setting the initial relative pose to the updated relative pose.

5. The computer-implemented method of claim 1, further comprising:
   powering the light sources in the device case inductively from the portable device.

6. The computer-implemented method of claim 1, further comprising:
   determining a change in an absolute pose of the portable device; and
   based on the change in the absolute pose of the portable device, updating a user interface.

7. The computer-implemented method of claim 1, wherein the light sources are located at corners of the device case.

8. A non-transitory computer-readable storage medium, the computer-readable storage medium including instructions that when executed by a processor, cause the processor to perform operations for providing gesture user input to a user interface displayed by a head-worn device, using movement of a portable device in a device case, the operations comprising:
   capturing, by the head-worn device, an image of the device case;
   receiving, by the head-worn device from the portable device, a pose of the portable device, the pose of the portable device including a position of the portable device in an environment;
   determining, by the head-worn device, an initial relative pose between the head-worn device and the portable device based on the image and the pose of the portable device;
   determining, by the head-worn device, a visual-inertial odometry (VIO)-based pose of the head-worm device;
   transmitting, by the head-worn device to the portable device, the VIO-based pose of the head worn device:
   determining, by the portable device, a change in the initial relative pose due to relative movement of the head-worn device and the portable device using the VIO-based pose of the head worn device;
   transmitting, by the portable device to the head worn device, the change in the initial relative pose; and
   based on the change in the initial relative pose, updating a user interface.

9. The non-transitory computer-readable storage medium of claim 8 wherein determining the change in the initial relative pose comprises:
   capturing a further image including representations of the light sources located in the device case; and
   determining an updated relative pose between the head-worn device and the portable device based on the further image.

10. The non-transitory computer-readable storage medium of claim 8 wherein the operations further comprise:
    obtaining first pose information for the head-worn device;
    obtaining second pose information for the portable device; and
    determining the change in the initial relative pose between the head-worn device and the portable device based on the first pose information and the second pose information.

11. The non-transitory computer-readable storage medium of claim 10, wherein the operations further comprise:
    after a specified interval, capturing a further image including representations of the light sources located in the device case;
    determining an updated relative pose between the head-worn device and the portable device based on the further image; and
    setting the initial relative pose to the updated relative pose.

12. The non-transitory computer-readable storage medium of claim 8, wherein the operations further comprise:
   powering the light sources in the device case inductively from the portable device.

13. The non-transitory computer-readable storage medium of claim 8, wherein the operations further comprise:
   determining a change in an absolute pose of the portable device; and
   based on the change in the absolute pose of the portable device, updating a user interface.

14. A computing system comprising:
   a head-worn device;
   at least one processor and a memory storing instructions; and
   a device case for holding a portable device, the device case including light sources located therein,
   wherein the instructions stored by the memory, when executed by the processor, configure the system to perform operations for providing gesture user input to a user interface displayed by the head-worn device when the light sources on the device case are illuminated, the operations comprising:
   capturing, by the head-worn device, an image of the device case;
   receiving, by the head-worn device from the portable device, a pose of the portable device, the pose of the portable device including a position of the portable device in an environment;
   determining, by the head-worn device, an initial relative pose between the head-worn device and the portable device based on the image and the pose of the portable device;
   determining, by the head-worn device, a visual-inertial odometry (VIO)-based pose of the head-worn device;
   transmitting, by the head-worn device to the portable device, the VIO-based pose of the head worn device;
   determining, by the portable device, a change in the initial relative pose due to relative movement of the head-worn device and the portable device using the VIO-based pose of the head worn device;
   transmitting, by the portable device to the head worn device, the change in the initial relative pose; and
   based on the change in the initial relative pose, updating a user interface.

15. The computing system of claim 14, wherein determining the change in the initial relative pose comprises:
   capturing a further image including representations of the light sources located in the device case; and
   determining an updated relative pose between the head-worn device and the portable device based on the further image.

16. The computing system of claim 14, wherein determining the change in the initial relative pose further comprises:
   obtaining first Visual-Inertial Odometry (VIO)-based pose information for the head-worn device;
   obtaining second VIO-based pose information for the portable device; and
   determining a change in the initial relative pose between the head-worn device and the portable device based on the first VIO-based pose information and the second VIO-based pose information.

17. The computing system of claim 16, further comprising:
   after a specified interval, capturing a further image including representations of the light sources located in the device case;
   determining an updated relative pose between the head-worn device and the portable device based on the further image; and
   setting the initial relative pose to the updated relative pose.

18. The computing system of claim 14, wherein the operations further comprise:
   powering the light sources in the device case inductively from the portable device.

19. The computing system of claim 14 wherein the operations further comprise:
   determining a change in an absolute pose of the portable device; and
   based on the change in the absolute pose of the portable device, updating a user interface.

20. The computing system of claim 14, wherein the light sources are located at corners of the device case.

* * * * *